(12) United States Patent
Loos et al.

(10) Patent No.: US 7,963,556 B2
(45) Date of Patent: Jun. 21, 2011

(54) AIR BAG MODULE INCLUDING A GAS DISTRIBUTING MEMBER

(75) Inventors: Andreas Loos, Rechberghausen (DE);
Dominique Acker, Gschwend (DE);
René Del Valle Alonso, Valladolid (ES)

(73) Assignees: TRW Automotive GmbH, Alfdorf (DE);
Dalphimetal Espana S.A., Madrid (ES)

( * ) Notice: Subject to any disclaimer, the term of this patent is extended or adjusted under 35 U.S.C. 154(b) by 0 days.

(21) Appl. No.: 12/539,632

(22) Filed: Aug. 12, 2009

(65) Prior Publication Data

US 2010/0038892 A1 Feb. 18, 2010

(30) Foreign Application Priority Data

Aug. 12, 2008 (DE) .................. 10 2008 037 365

(51) Int. Cl.
*B60R 21/26* (2006.01)
(52) U.S. Cl. ...................................................... 280/740
(58) Field of Classification Search .................. 280/729, 280/730.2, 740, 742
See application file for complete search history.

(56) References Cited

U.S. PATENT DOCUMENTS

| | | | |
|---|---|---|---|
| 7,021,652 B2 * | 4/2006 | Kumagai et al. | 280/729 |
| 7,104,569 B2 * | 9/2006 | Goetz | 280/736 |
| 7,357,411 B2 * | 4/2008 | Kurimoto et al. | 280/729 |
| 7,422,234 B2 * | 9/2008 | Huber et al. | 280/730.2 |
| 7,422,235 B2 * | 9/2008 | Wollin et al. | 280/730.2 |
| 7,431,329 B2 * | 10/2008 | Taguchi et al. | 280/729 |
| 7,597,348 B2 * | 10/2009 | Fukuda et al. | 280/730.2 |
| 7,597,351 B2 * | 10/2009 | Kashiwagi | 280/730.2 |
| 2004/0104563 A1 * | 6/2004 | Fischer | 280/743.1 |
| 2006/0001244 A1 * | 1/2006 | Taguchi et al. | 280/729 |
| 2006/0103119 A1 * | 5/2006 | Kurimoto et al. | 280/730.2 |
| 2007/0228701 A1 * | 10/2007 | Yamamura | 280/730.2 |
| 2008/0309055 A1 * | 12/2008 | Buhrlen et al. | 280/729 |

* cited by examiner

*Primary Examiner* — Paul N Dickson
*Assistant Examiner* — Robert A Coker
(74) *Attorney, Agent, or Firm* — Tarolli, Sundheim, Covell & Tummino LLP

(57) ABSTRACT

An air bag module (10) comprises an air bag (12), an inflator (14) and a gas distributing member (16) for distributing the gas escaping from the inflator (14) into different directions of flow. The gas distributing member (16) is configured so that it is deformed by the pressure exerted by the escaping gas such that thereby the distribution of the gas to the different directions of flow is influenced.

12 Claims, 4 Drawing Sheets

US 7,963,556 B2

AIR BAG MODULE INCLUDING A GAS DISTRIBUTING MEMBER

FIELD OF THE INVENTION

The invention relates to an air bag module comprising an air bag, an inflator and a gas distributing member for distributing the gas escaping from the inflator into different directions of flow.

BACKGROUND OF THE INVENTION

A gas distributing member allocated to an inflator serves for controlling the gas flow from the inflator into the air bag. Especially the gas provided by the inflator can be selectively distributed to different inflatable chambers of the air bag. Moreover, a gas distributing member can prevent hot gas from directly impinging on the wall or the stitching of the air bag.

From WO 2005/028264 A1 an air bag module including a gas distributing member is known that permits a distribution of the gas flow into two opposite directions to simultaneously fill two chambers of a side air bag. The hollow-cylindrical gas distributing member is attached to a tubular inflator and includes two bridge-shaped radial bulges. At an axial end of each bulge an opening is formed. Due to the different sizes of the openings, a larger amount of gas flows into the one chamber than into the other.

DE 10 2007 028 682 A1 shows a generic air bag module comprising a tubular inflator and a rigid sleeve-type gas distributing member of plastic material having a mounting portion to arrange the gas distributing member at the air bag. In a closed gas-bearing portion of the gas distributing member, which completely surrounds the inflator in the circumferential direction, plural inner gas-bearing channels are formed to lead the gas provided by the inflator into axially opposed directions. The gas-bearing channels can be formed especially by introducing ribs into the gas-bearing portion.

DE 10 2004 038 459 B4 illustrates an air bag module in which a deformable strap wound around the inflator unfolds and opens under the pressure of the gas until it is adjacent to the inner walls of an inner air bag disposed inside an outer air bag. The strap serves for protecting especially the outer air bag and the vehicle occupant against too strong heat influence.

It is the object of the invention to provide an inexpensive, compact and flexible solution for the gas distribution in an air bag module.

SUMMARY OF THE INVENTION

According to the invention this is achieved by an air bag module of the type mentioned in the beginning in which the gas distributing member is formed so that it is deformed by the pressure exerted by the escaping gas such that thereby the distribution of the gas to the different directions of flow is influenced. The invention is adapted to individually adjust the distribution of the gas flow of a standard inflator, which has been possible so far to a very restricted extent only. The invention is based on the finding that the pressure of the gas escaping from the inflator can be used to selectively deform the gas distributing member so as to influence the gas distribution as desired. The invention also has the advantage that by virtue of the deformation (expansion) of the gas distributing member the load thereof is definitely reduced.

The invention is preferably applicable to a side air bag module comprising a side air bag having a pelvis chamber and a thorax chamber or a thorax chamber and a head chamber which are inflated to different hardness. Usually, for such air bags tubular inflators are employed, the gas provided by them being distributed to the two chambers with the aid of the gas distributing member. A basically simple configuration of the gas distributing member is possible with a corresponding design of the air bag (arrangement of the inflating openings of the chambers) by the gas distributing member directing the gas into two opposite directions of flow.

In accordance with the preferred embodiments of the invention, the gas distributing member is a sleeve having a first gas escape area and an opposed second gas escape area, the sleeve being deformable by the gas pressure into a cone. The conical shape of the gas distributing member permits to increase the gas escape area more strongly for one of the air bag chambers so that more gas can be guided into said chamber than in the case of use of a rigid sleeve as gas distributing member.

The conical shape of the gas distributing member can be achieved, for instance, by a slotted gas distributing member. Such gas distributing member can be radially expanded, wherein, by appropriate measures, the expansion can be restricted at one axial end of the gas distributing member more strongly than at the other axial end.

For this purpose a specific auxiliary member can be provided which ensures a conical shaping of the air bag wall at which the gas distributing member can be supported in the area of the gas distributing member.

An appropriate auxiliary member is, for instance, a stitching of the air bag. In accordance with a first embodiment of the invention, the auxiliary member is part of a separating stitching that separates two inflatable chambers of the air bag from each other. Such stitching is provided in the air bag anyway and can be designed or supplemented as requested without a major technical effort, especially without additional parts or working steps.

Alternatively, the auxiliary member can also be formed by additionally inserted tissue layers the shape of which is adapted to the desired gas distribution. It is also possible to design the auxiliary member in the form of a belt or a tether.

DESCRIPTION OF EXAMPLE EMBODIMENTS

Figure 1:
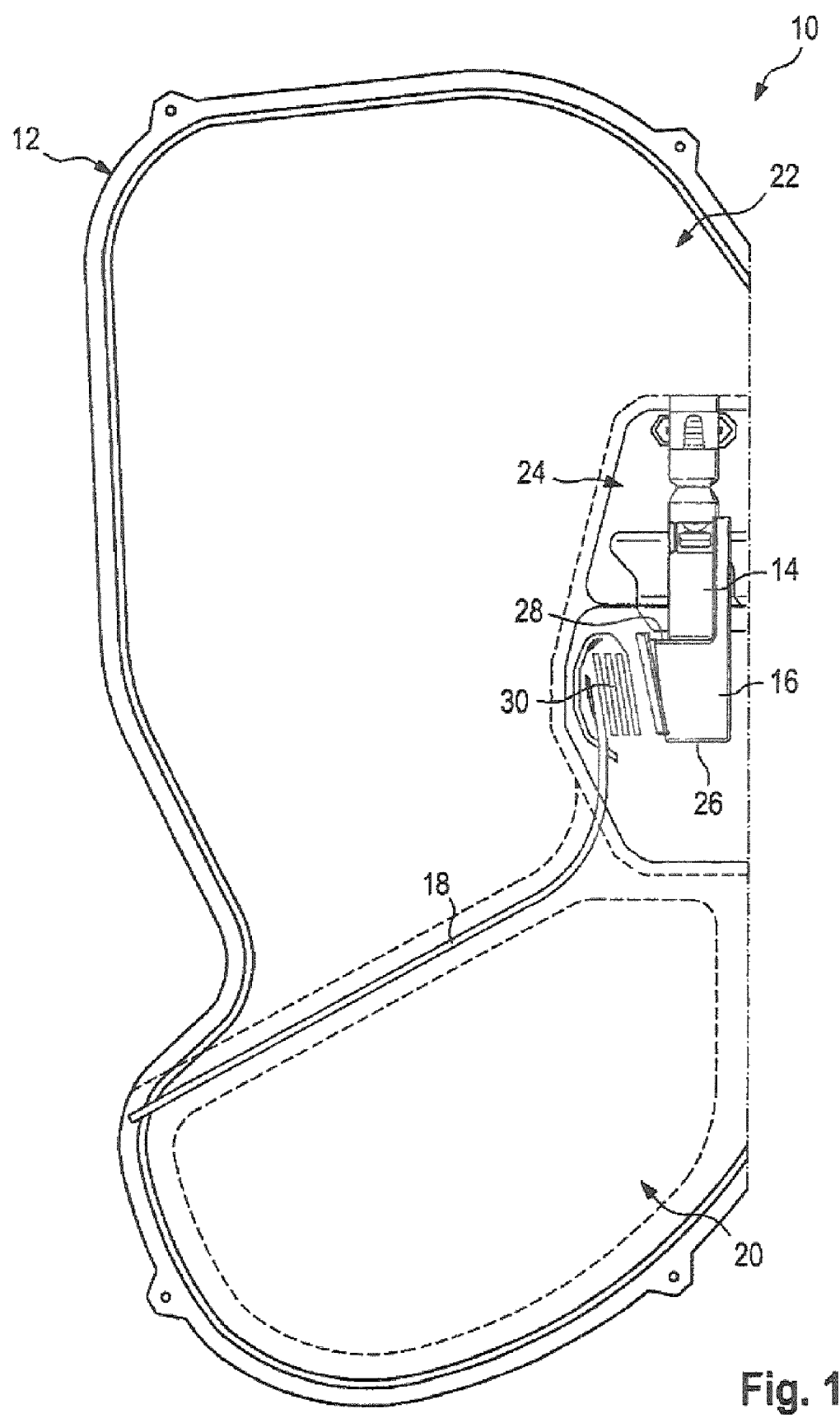
FIG. 1 shows an air bag module according to the invention comprising a non-inflated flatly laid out air bag.

The air bag module 10 shown in FIG. 1 comprises an air bag 12, an inflator 14 and a gas distributing member 16.

The air bag 12 consists of two (in the non-inflated state) tissue layers placed on top of each other and interconnected by stitching along their circumference. FIG. 1 shows only one of the two tissue layers of the air bag 12. The air bag 12 is divided into two inflatable chambers 20 and 22 by a separating stitching 18. The separating stitching 18 ends in an inlet area 24 of the air bag 12 in which the inflator 14 is accommodated.

The two tissue layers of the air bag may consist, as shown in FIG. 1, of a one-piece panel which is folded along an axis of symmetry and the edges of which are stitched to each other. The two tissue layers may also be separate panels stitched to each other along their entire circumferential line.

In the shown case, the inflator 14 is an elongated tubular inflator arranged so that a gas escape area of the inflator 14 is facing either of the two chambers, in this case the chamber 20.

The gas distributing member 16 is put over the escaping area of the inflator 14. The gas distributing member 16 is a sleeve consisting of metal or plastic material, especially a polymer, which serves for distributing the gas escaping from the gas generator 14 to the two chambers 20, 22. For this purpose, gas outlet areas 26 and 28 are provided at the two axial ends of the gas distributing member 16. Moreover, the gas distributing member 16 protects the tissue of the air bag 12 against the hot gas and the hot particles contained in the gas flow.

The air bag module 10 comprising the air bag 12 designed according to FIG. 1 and the inflator 14 can be mounted, for instance as a side impact protection device for a vehicle occupant, in a backrest of a vehicle seat. The lower chamber 20 in this case is a pelvis chamber, the upper chamber 22 is a thorax chamber, wherein the pelvis chamber 20 is to be inflated at higher pressure than the thorax chamber 22.

The invention is not restricted to the illustrated shape of the air bag 12 and the described application, however. Rather, the invention can be used in any form of an air bag having one or more inflatable chambers, also including woven or bonded connections, as well as in three-dimensional air bags made of any number of panels.

The inflator 14 is designed so that it has a main escape direction; in the shown event, it points to the direction of the lower chamber 20. Further, in the mounted state of the gas distributing member 16 the gas outlet area 26 facing the lower chamber 20 is larger. In order to nevertheless provide a possible control permitting to increase the gas flow into the upper chamber 22, the gas distributing member 16 shows a special configuration described hereinafter.

The sleeve-like gas distributing member 16 is substantially circular, viewed in cross-section; however, it is (axially) slotted in the longitudinal direction. The gas distributing member 16 thus has the shape of a "strap" wound around the gas escape area of the inflator 14 which is elastically deformable in radial direction. This configuration entails that the gas distributing member 16 can radially expand by the pressure of the gas escaping from the inflator 14 so that the gas outlet areas 26, 28 of the gas distributing member 16 are increased. The radial expansion simultaneously reduces the load of the gas distributing member 16 by the hot gas and the entrained particles.

Figure 3:
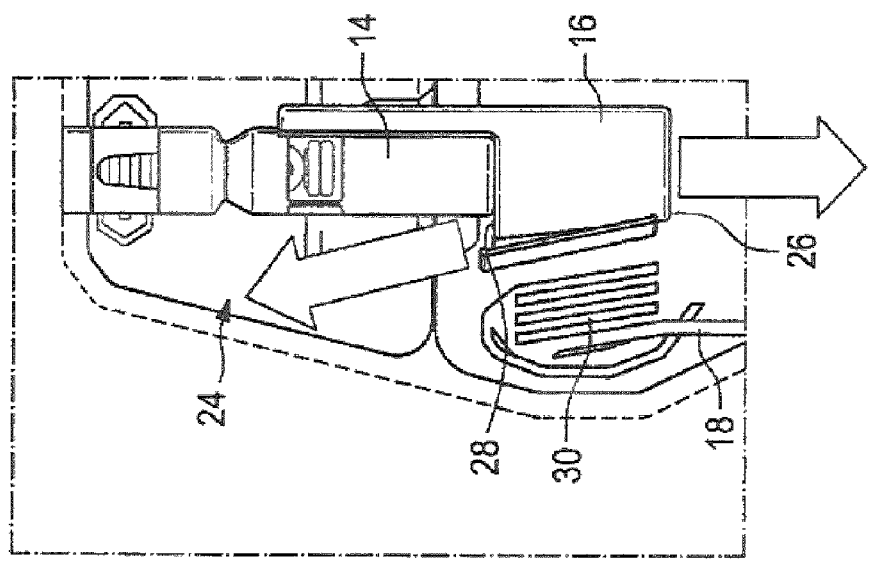
FIG. 3 shows an enlarged detail according to FIG. 2 in the activated state of the inflator.
Figure 2:
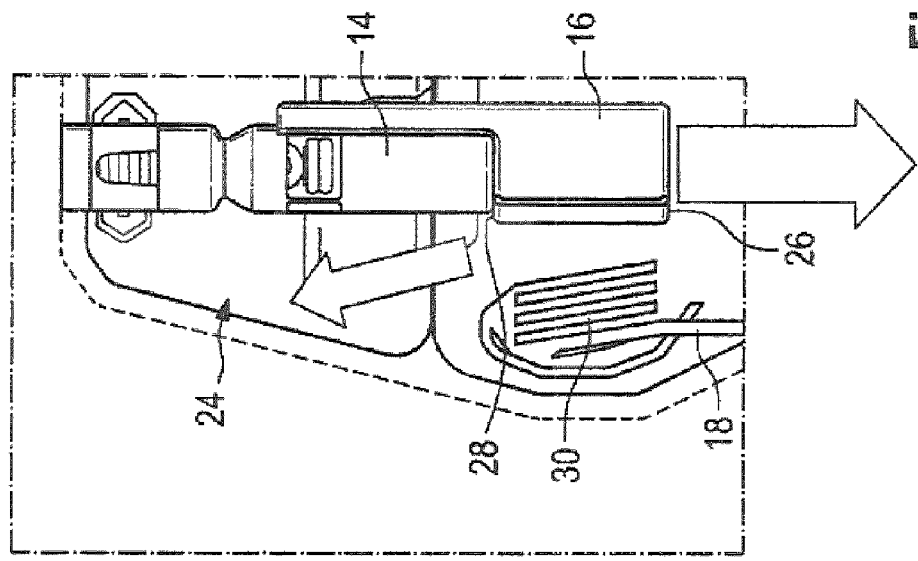
FIG. 2 shows an enlarged detail of FIG. 1 in the mounted stated.

The expansion of the gas distributing member 16 is restricted, however. The shape imparted to the gas distributing member 16 during its expansion is selectively influenced by an auxiliary member 30. As viewed in FIG. 3, the gas distributing member 16 expands to form a cone. In this way, one of the gas outlet areas, in this case the area 28, is increased to a greater extent than the other, in this case the area 26. The gas can escape from the gas distributing member 16 through both gas outlet areas 26, 28 toward the chamber 20 or the chamber 22, but the amount of gas is different due to the differently large gas outlet areas 26, 28.

In the shown embodiment according to FIG. 1, the auxiliary member 30 is the separating stitching 18, more exactly speaking the portion of the separating stitching 18 ending in the inlet area 24 of the air bag 12. This portion of the separating stitching 18 is configured so that in the area of the gas distributing member 16 it provides a conical shape of the air bag wall at which the gas distributing member 16 is supported. This can be obtained, for instance, by stitching portions inclined vis-à-vis the longitudinal axis of the inflator 14 or the gas distributing member 16.

In the case of a side air bag the gas outlet area 28 of the gas distributing member 16 facing the lower chamber 22 thus can be selectively increased so that more gas can be introduced into said lower chamber 22.

Also auxiliary members other than the separating stitching 18 can be provided to obtain the desired shape of the gas distributing member 16 upon inflating the air bag 12. In particular, the auxiliary member may be a belt or a tether which imparts to the air bag 12 in the area of the gas distributing member 16 a conical shape at which the gas distributing member 16 can be supported. A tether or an additional belt arranged between the two chambers 20, 22 can also directly keep the gas distributing member 16 in the desired shape.

Figure 4:
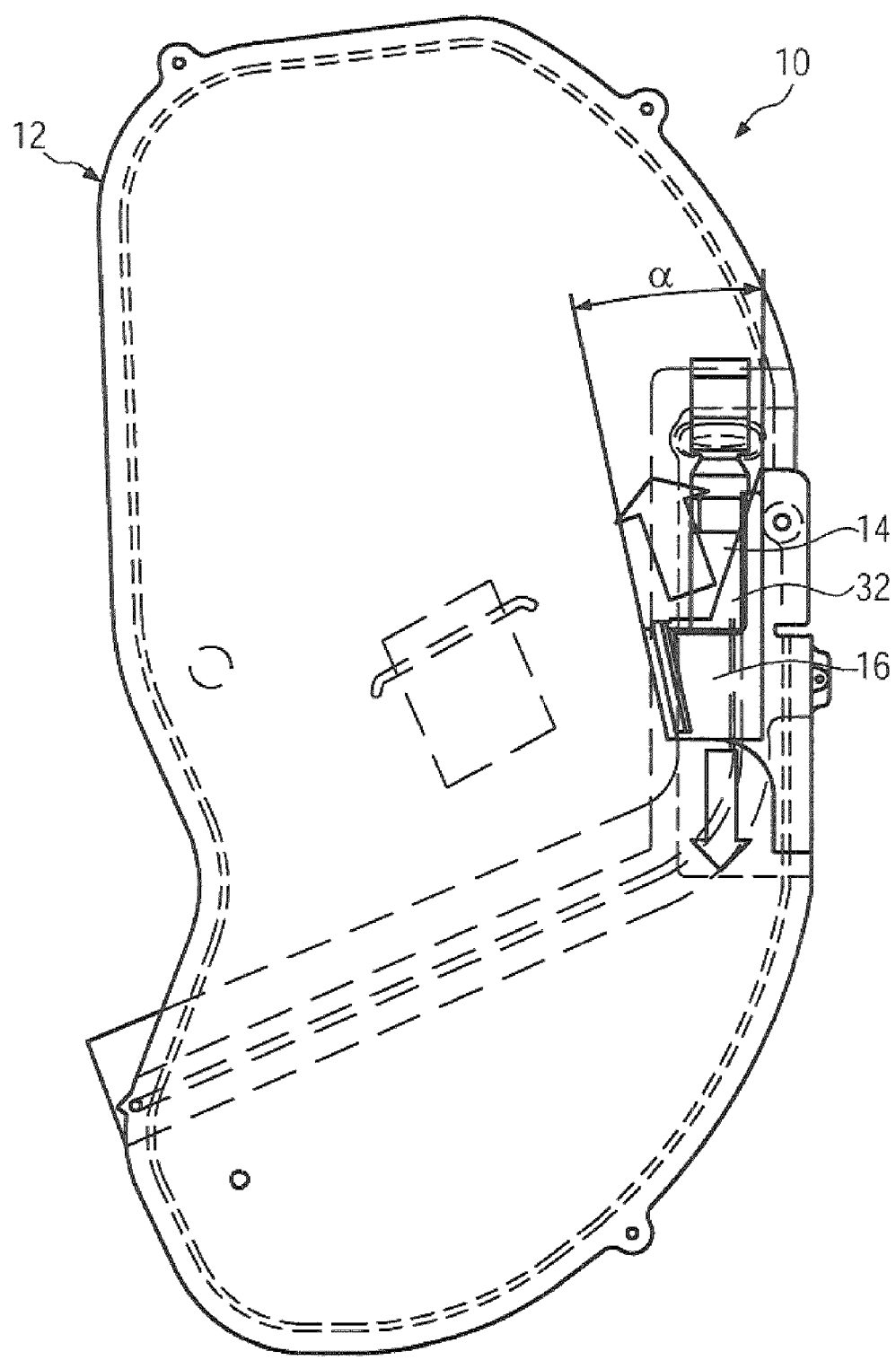
FIG. 4 is a second embodiment of the air bag module according to the invention.
Figure 5:
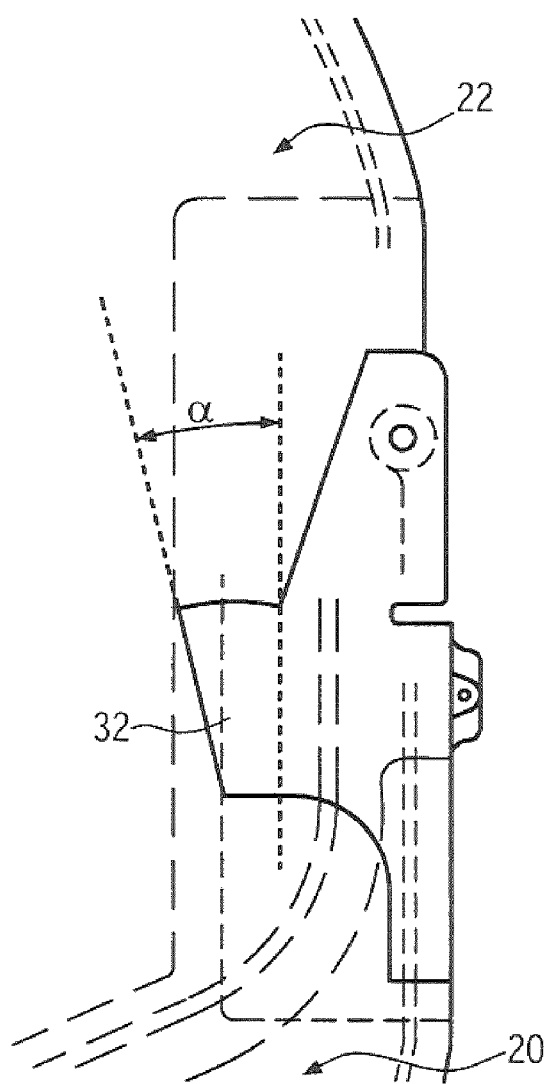
FIG. 5 is a detailed view of the auxiliary member according to FIG. 4.
Figure 6:
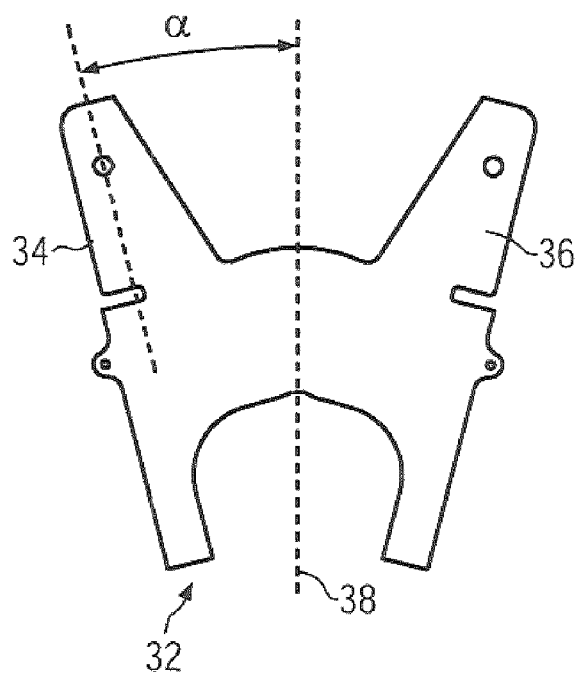
FIG. 6 represents a detail of the embodiment according to FIG. 4.

FIGS. 4 to 6 illustrate a further possible embodiment of the auxiliary member. In this case, the auxiliary member is formed by an additional tissue layer encompassing the gas distributing member in the form of a loop. The additional tissue layer 32 has a mirror-symmetric configuration and in the flatly laid out state is H-shaped. The two longitudinal legs 34 and 36 are inclined with respect to the longitudinally extending axis of symmetry 38, namely by the angle α corresponding to the cone angle of the gas distributing member to be adjusted. When mounting and/or stitching the air bag, the additional tissue layer 32 is folded along the axis of symmetry 38. The then superimposed longitudinal legs 34 and 36 are inserted between the tissue layers of the air bag superimposed in the area of the inflator and are stitched with the edge stitching of the air bag. The loop formed in this way encompasses the inflator and the gas distributing member in the fully mounted state of the air bag module.

When gas escapes, the gas distributing member 16 expands. The expansion is restricted by the additional tissue layer 32, as the wall of the gas distributing member contacts the additional tissue layer. The gas distributing member adopts a conical shape the cone angle of which corresponds to the cone angle α of the tissue layer.

The invention claimed is:

1. An air bag module comprising an air bag (12), an inflator (14) and a gas distributing member (16) for distributing the gas escaping from the inflator (14) into different directions of flow, characterized in that the gas distributing member (16) is elastically deformable in a radial direction and is configured so that it is deformed by the pressure exerted by the escaping gas such that thereby the distribution of the gas to the different directions of flow is influenced, characterized in that the gas distributing member (16) is a sleeve having a first gas outlet area (26) and an opposed second gas outlet area (28), the sleeve being deformable by the gas pressure into a cone.

2. An air bag module according to claim 1, characterized in that the gas distributing member (16) directs the gas into two opposite directions of flow.

3. An air bag module according to claim 1, characterized in that the gas distributing member (16) is slotted.

4. An air bag module according to claim 1, characterized by an auxiliary member (30) which in the area of the gas distributing member (16) provides a conical configuration of the air bag wall at which the gas distributing member (16) can be supported.

5. An air bag module according to claim 4, characterized in that the auxiliary member (30) is inclined vis-à-vis the longitudinal axis of the inflator (14) or the gas distributing member (16).

6. An air bag module according to claim 4, characterized in that the auxiliary member (30) is a stitching (18).

7. An air bag module according to claim 6, characterized in that the auxiliary member (30) is part of a separating stitching (18) which separates two inflatable chambers (20, 22) of the air bag (12).

8. An air bag module according to claim 4, characterized in that the auxiliary member is a belt or a tether.

9. An air bag module according to claim 1, characterized in that in the area of the gas distributing member an auxiliary member consisting of at least one tissue layer (32) is arranged at which the gas distributing member deformed into a cone can be supported.

10. An air bag module according to claim 9, characterized in that the additional tissue layer (32) is in the form of a conical loop and is stitched with the air bag.

11. An air bag module according to claim 1, characterized in that the gas distributing member (16) is made of metal.

12. An air bag module according to claim 1, characterized in that the gas distributing member (16) is made of plastic material, especially a polymer.

* * * * *